United States Patent
Takahashi et al.

(10) Patent No.: US 6,419,605 B1
(45) Date of Patent: Jul. 16, 2002

(54) V-RIBBED BELT

(75) Inventors: Osamu Takahashi; Hiroshi Fujimoto, both of Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 09/551,543

(22) Filed: Apr. 18, 2000

(30) Foreign Application Priority Data

Apr. 21, 1999 (JP) ............................................ 11-113105

(51) Int. Cl.[7] ................................................. F16G 5/20
(52) U.S. Cl. ....................................................... 474/237
(58) Field of Search ................................ 474/237, 260, 474/261, 262, 263, 265

(56) References Cited

U.S. PATENT DOCUMENTS

| | | | | |
|---|---|---|---|---|
| 4,710,155 A | * | 12/1987 | Matsuoka et al. | 474/260 |
| 5,230,668 A | * | 7/1993 | Kawashima et al. | 474/263 |
| 5,776,026 A | * | 7/1998 | Tajima et al. | 474/267 |
| 5,792,018 A | * | 8/1998 | Winninger | 474/260 |
| 6,177,202 B1 | * | 1/2001 | Takahara et al. | 428/515 |

FOREIGN PATENT DOCUMENTS

| | | |
|---|---|---|
| DE | 197 14 919 A | 11/1997 |
| EP | 0 339 249 A | 11/1989 |
| EP | 0 433 861 A | 6/1991 |
| JP | 09-236156 | 9/1997 |
| JP | 09-273607 | 10/1997 |

* cited by examiner

Primary Examiner—David A. Bucci
Assistant Examiner—Vicky A. Johnson
(74) Attorney, Agent, or Firm—Nixon Peabody LLP; Thomas W. Cole (57) ABSTRACT

In a V-ribbed belt, the dimension H1 from the rib-side end of a tension member to the bottom of a rib is set in the range of 1.0 to 2.0 mm to thicken the bottom side of the belt, thereby reducing a shock as caused when the belt vibrates and strikes a pulley. The dimension H2 from the rib-side end of the tension member to the top of the rib is set in the range of 3.0 to 4.0 mm or the belt with five ribs is set to exhibit a flexural rigidity of 39.2 N·cm$^2$ or more when subjected to a flexural rigidity test, thereby enhancing the flexural rigidity of the belt. Alternatively, the belt with five ribs is set to exhibit a dynamic spring constant of 850 N/mm or more when subjected to a dynamic response test, thereby providing a sufficient dynamic spring constant to the belt. Alternatively, the belt with five ribs is set to exhibit a dynamic damping constant of 0.065 N·S/mm or more when subjected to the dynamic response test, thereby providing a sufficient dynamic damping constant to the belt. According to these settings, production of vibration and associated noise during the running of the V-ribbed belt can be suppressed without the need for tension management of the belt and provision of an idler pulley.

2 Claims, 7 Drawing Sheets

V-RIBBED BELT

BACKGROUND OF THE INVENTION

This invention relates to a V-ribbed belt, and particularly relates to techniques for reducing vibration and noise thereof.

V-ribbed belts of such kind are conventionally well known and generally put into wide use as belts for driving engine accessories or other purposes. For example, Japanese Patent Application Laid-Open Gazettes Nos. 9-236156 and 9-273607 propose a technique of using ethylene-2,6-naphtalate fibers (PEN fibers) as a material for a tension member (cord) embedded into a V-ribbed belt thereby increasing resistance to flexural fatigue of the belt or reducing the slip ratio thereof.

Meanwhile, in recent years, as the quietness of a vehicle engine has been increasingly enhanced, vibration and associated noise in a driving device for an engine auxiliary have been relatively intensified.

In order to reduce such vibration and noise, there have been conventionally employed a method of using a V-ribbed belt of increased tension or a technique of adjusting the layout of an engine auxiliary driving device including a V-ribbed belt to press an idler pulley against the back face of the belt in a span between pulleys.

However, a power transmission belt generally has the characteristic of reducing its tension due to creep of its tension member or wear of itself. Therefore, if the belt is adjusted to increase its tension in the above conventional manner, this invites inconveniences such as increase in the frequency of maintenance for tension management. It is substantially impossible to ask general users to carry out such maintenance.

On the other hand, if an idler pulley is arranged to press a belt portion located in the span between pulleys, a space for supporting the idlerpulley is necessary. This invites higher cost.

An object of the present invention is to suppress production of vibration and associated noise during the running of a V-ribbed belt without the need for tension management of the belt and provision of an idler pulley by appropriately setting characteristics such as the shape or material of the V-ribbed belt.

SUMMARY OF THE INVENTION

To attain the above object, in the present invention, a tension member of a V-ribbed belt has a high spring constant or a high damping constant or the flexural rigidity of the belt is enhanced, thereby reducing vibration of the belt caused in its span between pulleys. Alternatively, a rubber portion of the belt is thickened so that a shock caused when the belt strikes a pulley can be cushioned.

More specifically, an aspect of the present invention is directed to a V-ribbed belt in which a tension member is embedded and a plurality of ribs are formed in a bottom face thereof to extend in parallel with one another along the length of the belt, and the V-ribbed belt is characterized in that the dimension from a rib-side end of the tension member to a rib bottom is set in the range of 1.0 to 2.0 mm.

With this construction, since the bottom-side portion of the V-ribbed belt is sufficiently large in thickness, a shock caused when the belt vibrates and strikes a pulley can be cushioned and noise associated with the vibration (noise produced by the strike of the belt on the pulley) can be reduced. If the dimension from the rib-side end of the tension member to the rib bottom is below 1.0 mm, the effect of cushioning the shock cannot sufficiently be acquired. On the contrary, if the dimension is over 2.0 mm, the resistance of the belt to flexural fatigue is lowered and the belt life is shortened. Therefore, the dimension from the rib-side end of the tension member to the rib bottom is set in the range of 1.0 to 2.0 mm.

A second aspect of the present invention is directed to the same V-ribbed belt as that of the first aspect, and characterized in that the dimension from a rib-side end of the tension member to a rib top is set in the range of 3.0 to 4.0 mm. With this construction, since the flexural rigidity of the belt is enhanced, the belt becomes difficult to vibrate in its span between pulleys. As a result, vibration and associated noise of the belt can be reduced. If the dimension from the rib-side end of the tension member to the rib top is below 3.0 mm, the flexural rigidity cannot sufficiently be enhanced. On the contrary, if the dimension is over 4.0 mm, the resistance of the belt to flexural fatigue is lowered and the belt life is shortened. Therefore, the dimension from the rib-side end of the tension member to the rib top is set in the range of 3.0 to 4.0 mm.

A third aspect of the present invention is also directed to the same V-ribbed belt as that of the first aspect, and characterized in that the V-ribbed belt is set to exhibit a dynamic spring constant of 170 N/mm or more per rib when subjected to a dynamic response test which is conducted to grip a specimen of the belt in developed condition between fixed and movable chucks spaced 150 mm apart from each other and vibrate the specimen lengthwise of the belt by throwing repeated loads of 490.3±147.1 N at a vibration frequency of 50 Hz on the movable chuck, (i.e., a dynamic spring constant of 850 N/m or more for five ribs when the belt specimen is subjected to the same dynamic response test). With this construction, since the spring constant of the belt is sufficiently large, the belt is difficult to vibrate in its span between pulleys. As a result, vibration and associated noise of the belt can be reduced. If the dynamic spring constant of the belt is smaller than 170 N/mm, the effect of reducing vibration of the belt becomes insufficient. Therefore, the dynamic spring constant of the belt is set at 170 N/mm or more.

A fourth aspect of the present invention is also directed to the same V-ribbed belt as that of the first aspect, and characterized in that the V-ribbed belt is set to exhibit a dynamic damping constant of 0.013 N·S/mm or more per rib when subjected to the same dynamic response test (i.e., a dynamic damping constant of 0.065 N·S/mm or more for five ribs when the belt specimen is subjected to the same dynamic response test). With this construction, since the damping constant is sufficiently large, the belt is difficult to vibrate in its span between pulleys. As a result, vibration and associated noise of the belt can be reduced. If the dynamic damping constant is smaller than 0.013 N·S/mm, the effect of reducing vibration of the belt is insufficient. Therefore, the dynamic damping constant of the belt is set at 0.013 N·S/mm or more.

A fifth aspect of the present invention is also directed to the same V-ribbed belt as that of the first aspect, and characterized in that when the V-ribbed belt is subjected to a flexural rigidity test which is conducted to place the belt between a pair of upper and lower pressing plates of a testing device constructed such that the upper and lower pressing plates are held in parallel with each other by a pair of links to form a parallelogram by both the pairs of pressing plates and links and set a weight of 6.86 N on the upper pressing plate to deform the belt in a flat-like shape, the flexural rigidity of the V-ribbed belt determined, based on the distance l (unit: cm) between both portions of the tension member located respectively in upper and lower spans of the belt in deformed condition, from the following formula:

Flexural rigidity (unit: N·cm$^2$)=0.174×$W$×$l^2$, is 7.84 N·cm$^2$ or more per rib (i.e., the flexural rigidity of the V-ribbed belt subjected to the same flexural rigidity test is 39.2 N·cm$^2$ or more for five ribs). With this construction, since the flexural rigidity of the belt is enhanced, the belt becomes difficult to vibrate in its span between pulleys. As a result, vibration and noise of the belt can be reduced. If the flexural rigidity of the belt is less than 7.84 N·cm$^2$, it cannot sufficiently be enhanced. Therefore, the flexural rigidity of the belt is set at 7.84 N·cm$^2$ or more.

DESCRIPTION OF THE PREFERRED EMBODIMENT

Figure 1:
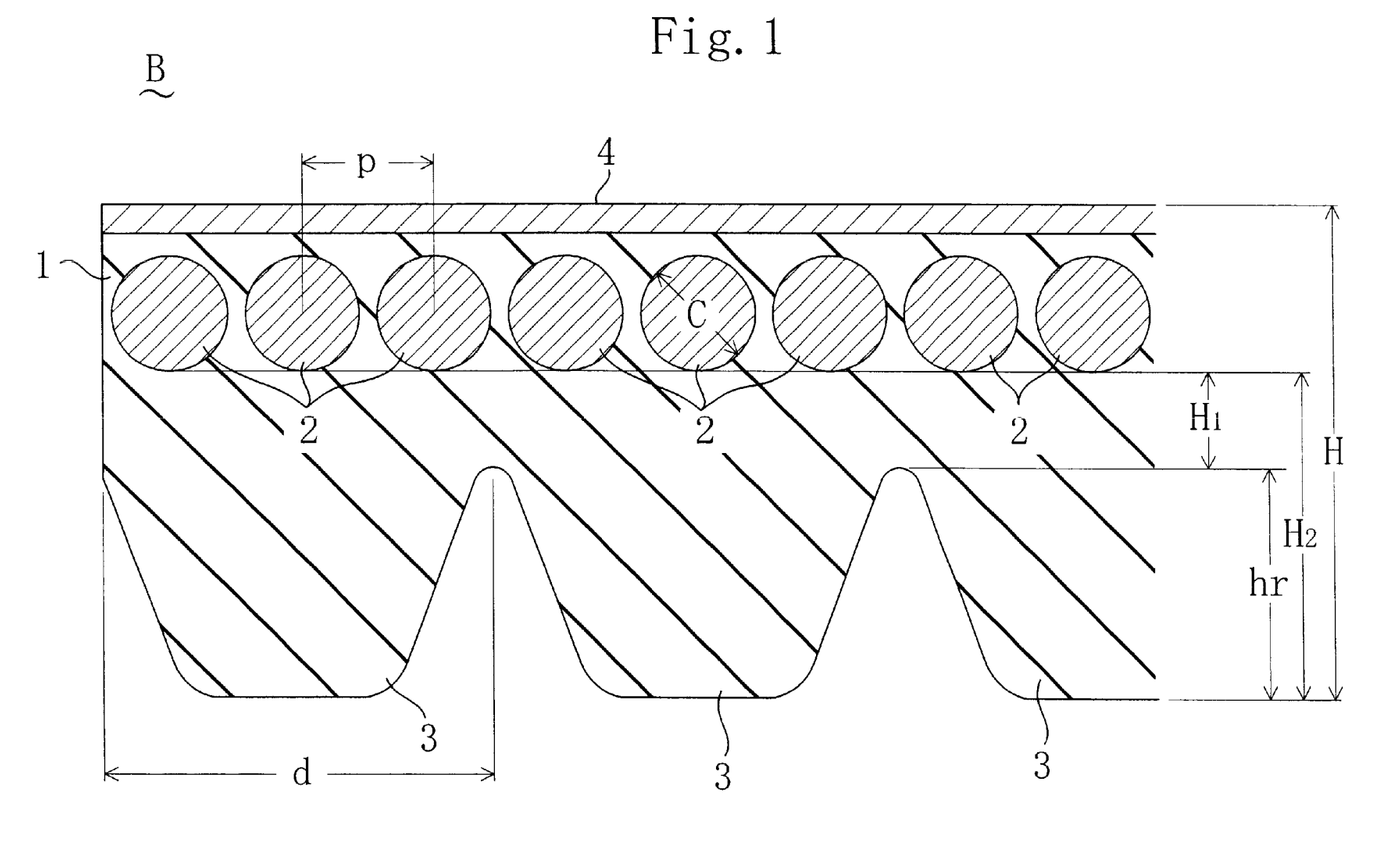
FIG. 1 is an enlarged sectional view of a V-ribbed belt according to an embodiment of the present invention.
Figure 2:
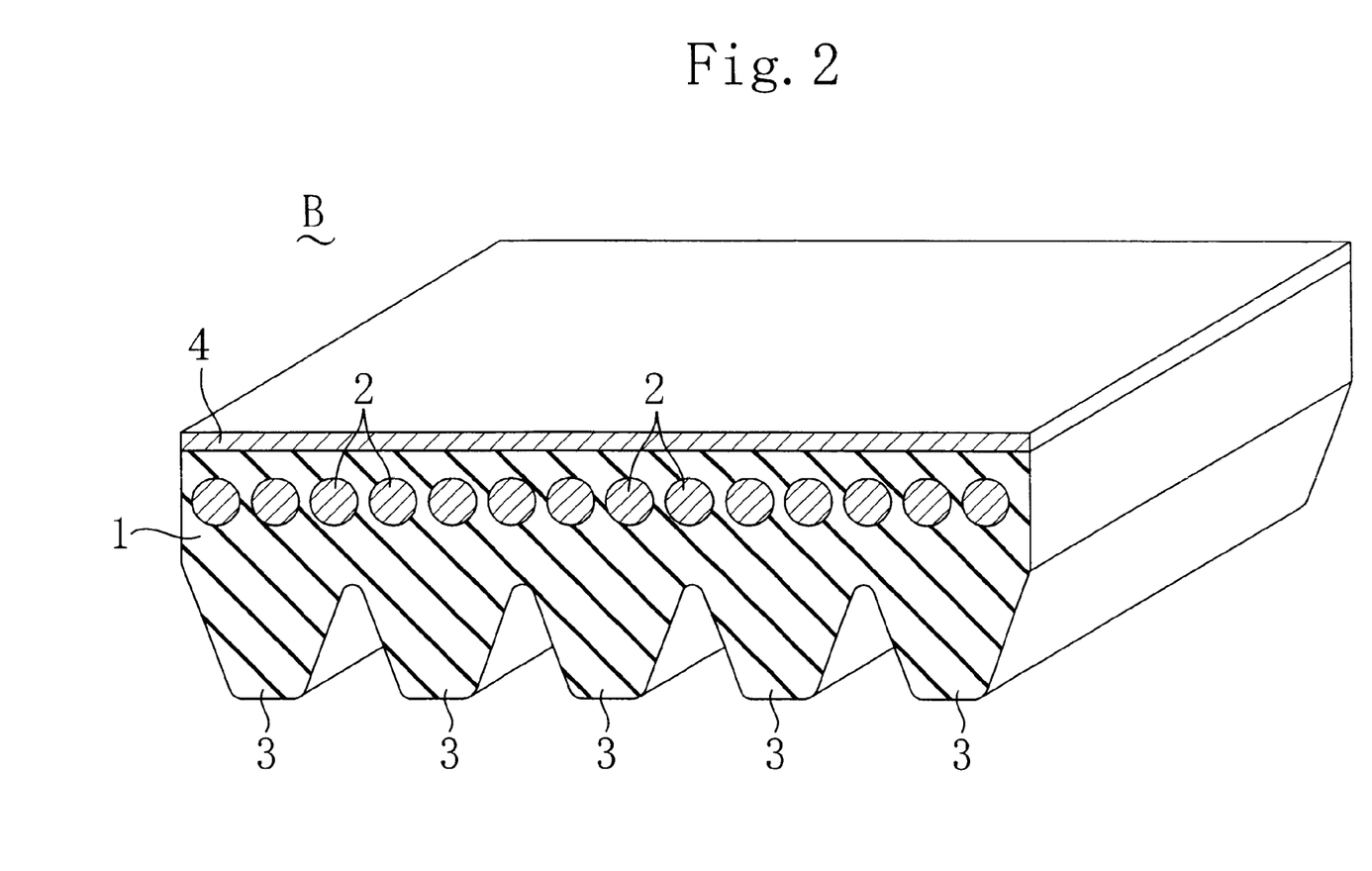
FIG. 2 is a partly perspective view of the V-ribbed belt.

Hereinafter, an embodiment of the present invention will be described with reference to the drawings. FIGS. 1 and 2 show a V-ribbed belt B according to an embodiment of the present invention. The belt B is, for example, a belt commonly called "5PK type" of five ribs and having a thickness of H. In FIG. 1, the reference numeral 1 denotes an endless belt body made of rubber. The belt body 1 includes a tension member (cord) 2 with an outer diameter of C (=1.0 mm) which is embedded therein to locate the center of the outer diameter at a depth of for example 0.95 mm from the belt back face and arranged spirally in the widthwise direction of the belt (lateral direction in FIG. 1) at a specific pitch of P (=1.15 mm). Used for the tension member 2 are materials of high tensile strength such as ethylene-2,6-naphtalate fibers (hereinafter, also referred to as "PEN fibers"), polyethylene terephthalate fibers (PET fibers), polyvinyl alcohol fibers (PVA fibers) or aramid fibers.

A plurality of (for example, five) ribs 3, 3, . . . of substantially trapezoidal section with a height of hr (=2.0 mm) and a width of d (=3.56 mm) are formed in the bottom face of the belt body 1 to extend in parallel with one another along the length of the belt and at regular pitches along the width of the belt. A top fabric 4 is provided on the back face of the belt body 1.

The dimension H1 from a rib-side end of the tension member 2 to the bottom of the rib 3 is set in the range of 1.0 to 2.0 mm. Furthermore, the dimension H2 from the rib-side end of the tension member 2 to the top of the rib 3 is set in the range of 3.0 to 4.0 mm (wherein H2=H1+hr).

In addition, the belt B with five ribs 3 is set to exhibit a dynamic spring constant of 850 N/mm or more (i.e., 170 N/mm or more per rib) when subjected to a dynamic response test described later, and set to exhibit a dynamic damping constant of 0.065 N·S/mm or more (i.e., 0.013 N·S/mm or more per rib) when subjected to the same dynamic response test. Furthermore, the belt B with five ribs 3 is set to exhibit a flexural rigidity of 39.2 N·cm$^2$ or more (i.e., 7.84 N·cm$^2$ or more per rib) when subjected to a flexural rigidity test described later.

According to this embodiment, since the dimension H2 from the rib-side end of the tension member 2 to the top of the rib 3 in the V-ribbed belt B is in the range of 3.0 to 4.0 mm, the belt B can increase its flexural rigidity over the conventional V-ribbed belt. In addition, since the flexural rigidity of the belt B with five ribs 3 when subjected to the flexural rigidity test is at 39.2 N·cm$^2$ or more, the belt B can further increase its flexural rigidity. Such increased flexural rigidity of the belt B make it difficult for the belt B to vibrate in a span between pulleys, namely, can reduce vibration of the belt B.

Further, since the dynamic spring constant of the belt B with five ribs 3 when subjected to the dynamic response test is at 850 N/mm or more, the belt B can also increase its spring constant over the conventional V-ribbed belt. This makes it further difficult for the belt B to vibrate in a span between pulleys, namely, can further reduce vibration of the belt B.

Moreover, since the dynamic damping constant of the belt B with five ribs 3 when subjected to the dynamic response test is at 0.065 N·S/mm or more, the belt B can increase its damping constant over the conventional V-ribbed belt. This also makes it further difficult for the belt B to vibrate in a span between pulleys, namely, can further reduce vibration of the belt B.

In addition, in this embodiment, the dimension H1 from the rib-side end of the tension member 2 to the bottom of the rib 3 is in the range of 1.0 to 2.0 mm. Therefore, even if the belt B vibrates, a shock caused when the belt B strikes a pulley can be reduced and noise associated with the vibration (noise produced by the strike of the belt on the pulley) can be also reduced.

This embodiment includes all of the following constructions that: the dimension H1 from the rib-side end of the tension member 2 to the bottom of the rib 3 is set in the range of 1.0 to 2.0 mm; the dimension H2 from the rib-side end of the tension member 2 to the top of the rib 3 is set in the range of 3.0 to 4.0 mm; the dynamic spring constant of the belt B with five ribs 3 when subjected to the dynamic response test is set at 850 N/mm or more; the dynamic damping constant of the belt B with five ribs 3 when subjected to the dynamic response test is set at 0.065 N·S/mm or more; and the flexural rigidity of the belt B with five ribs 3 when subjected to the flexural rigidity test is set at 39.2 N·cm$^2$ or more. However, the present invention may include one or some of the above constructions.

Next, a specific example of the present invention will be described. Respective specimens (hereinafter, also referred to as "belts") for three Inventive examples 1 through 3 and two Comparative examples 1 and 2 were prepared by changing a V-ribbed belt B (with five ribs) of "5PK1130" type, which is of the same construction as that of the above embodiment, in material of the tension member 2, belt thickness H, the dimension H1 from the rib-side end of the tension member 2 to the rib 3 bottom and the dimension H2 from the rib-side end of the tension member 2 to the rib 3 top. The details of the specimens are shown in Table 1 described below. It is to be noted that tension members 2 of all the following belts B are of 2×3 twisted configuration of fibers (PEN fibers or PET fibers) of 1,000 denier.

TABLE 1

|      | Inventive example | | | Comparative example | |
|------|------|------|------|------|------|
|      | 1    | 2    | 3    | 1    | 2    |
| Cord | PEN  | PET  | PEN  | PET  | PET  |
| H (mm)  | 4.3  | 4.8  | 4.8  | 4.3  | 5.5  |
| H1 (mm) | 0.85 | 1.35 | 1.35 | 0.85 | 2.05 |
| H2 (mm) | 2.85 | 3.35 | 3.35 | 2.85 | 4.05 |

Dynamic Response Test for Belt

Figure 3:
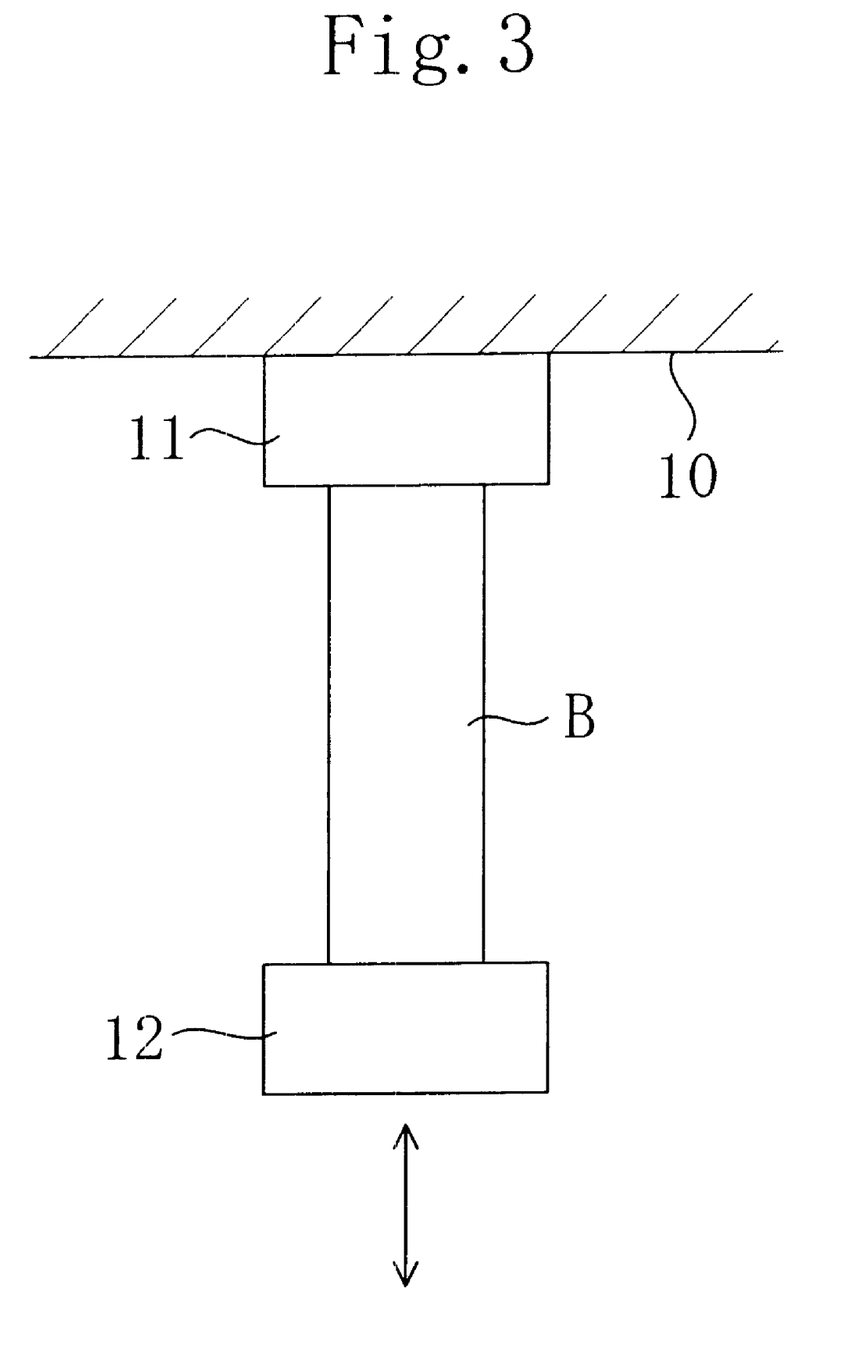
FIG. 3 is a diagram illustrating a testing device for determining dynamic characteristics of the belt.

A dynamic response test was conducted on each of the above specimens. As shown in FIG. 3, a testing device for this test includes an upper chuck (fixed chuck) 11 fixed to a fixed member 10 and a lower chuck (movable chuck) 12 spaced 150 mm downwardly apart from the upper chuck 11. In the test, a specimen of the belt B in developed condition was gripped at its upper and lower ends between both the chucks 11 and 12 and vibrated vertically (lengthwise of the belt B) by throwing repeated loads of 490.3±147.1 N at a vibration frequency of f (=50 Hz) from an unshown servo motor onto the lower chuck 12. The ambient temperature was a room temperature.

Figure 4:
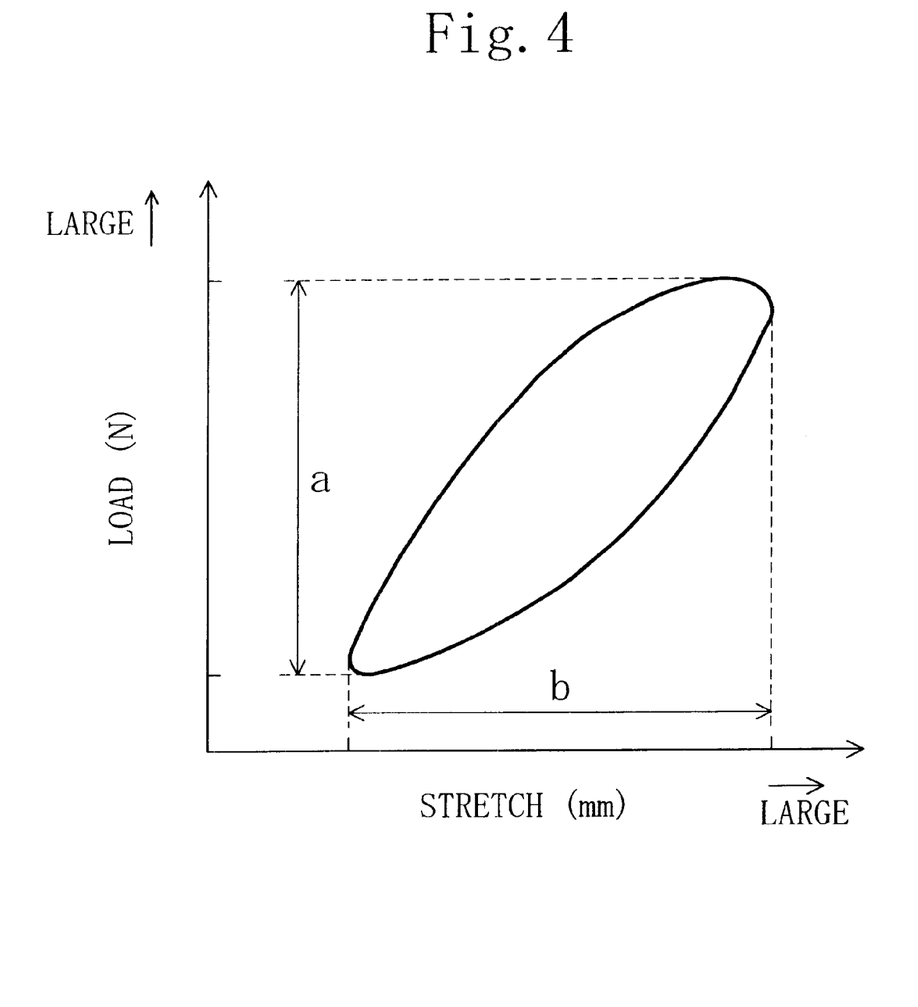
FIG. 4 is a graph showing a hysteresis loop obtained as a result of a dynamic response test on the belt.

When the relation between stretch (unit: mm) of the belt and thrown load (unit: N) in the above test is represented in coordinates, ahysteresis loop as shown in FIG. 4 can be obtained. With reference to the obtained hysteresis loop, the dynamic spring constant and the dynamic damping constant were determined, based on a difference a between maximum and minimum loads and a difference b between maximum and minimum stretches, from the following formulae:

$$\text{Dynamic spring constant (unit: } N/\text{mm}) = a/b;$$

and $$\text{Dynamic damping constant (unit: } N \cdot S/\text{mm}) = (a/b) \times (\tan \delta / 2\pi f),$$

wherein tan δ in the formula for dynamic damping constant is a loss factor in a dynamic viscoelasticity test for rubber. The test results are shown in Table 2 described later.

Flexural Rigidity Test for Belt

Figure 5A:
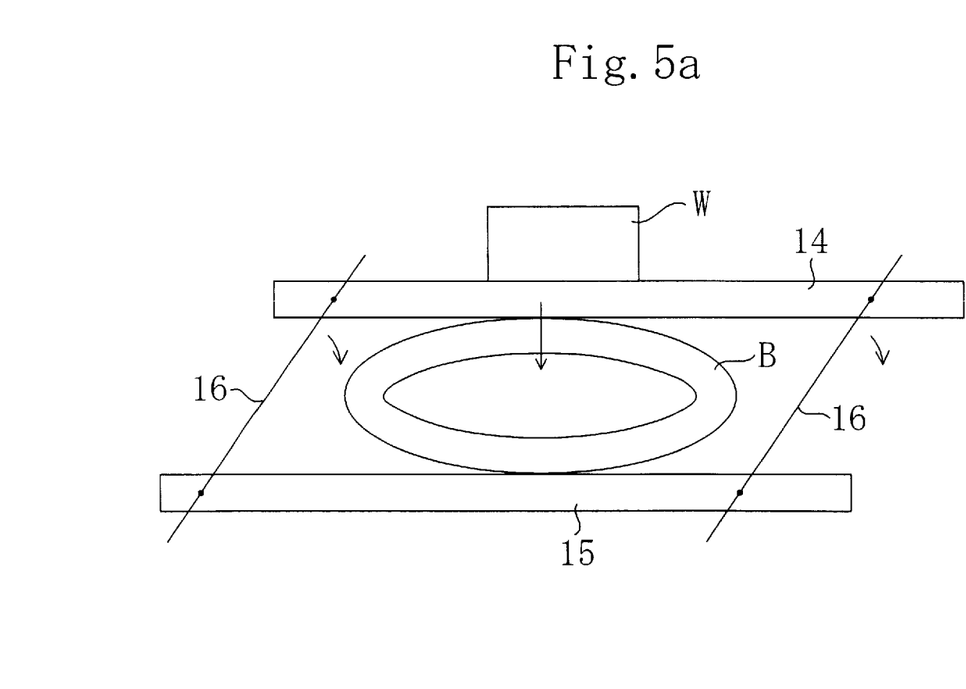
FIG. 5 is a diagram illustrating a testing device for determining the flexural rigidity of the belt.
Figure 5B:
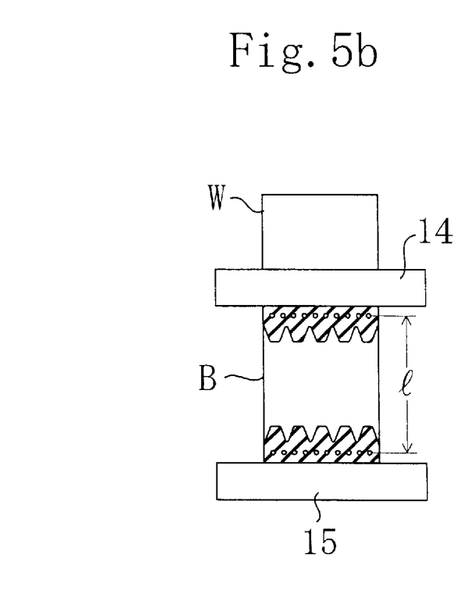

A flexural rigidity test was also conducted on each of the belts. As shown in FIG. 5, a testing device for this test is constructed such that upper and lower pressing plates 14, are held in parallel with each other by right- and left-hand links 16, 16 to form a parallelogram by all these components. In the test, the belt B (5PK1130) was placed between the upper and lower pressing plates 14, 15, a weight W of 6.86 N was set on the upper pressing plate 14 to deform the belt B in a flat-like shape, and the flexural rigidity of the belt B at this time was determined, based on the distance 1 (unit: cm) between both portions of the tension member 2 located respectively in upper and lower spans of the belt B in this deformed condition, from the following formula:

$$\text{Flexural rigidity (unit: kg·cm}^2) = 0.174 \times W \times 1^2$$

wherein the flexural rigidity is expressed as the product EI of Young's module E and moment of inertia of the section I. The test result are shown in Table 2 described later.

Vibration and Noise Test for Belt

Figure 6:
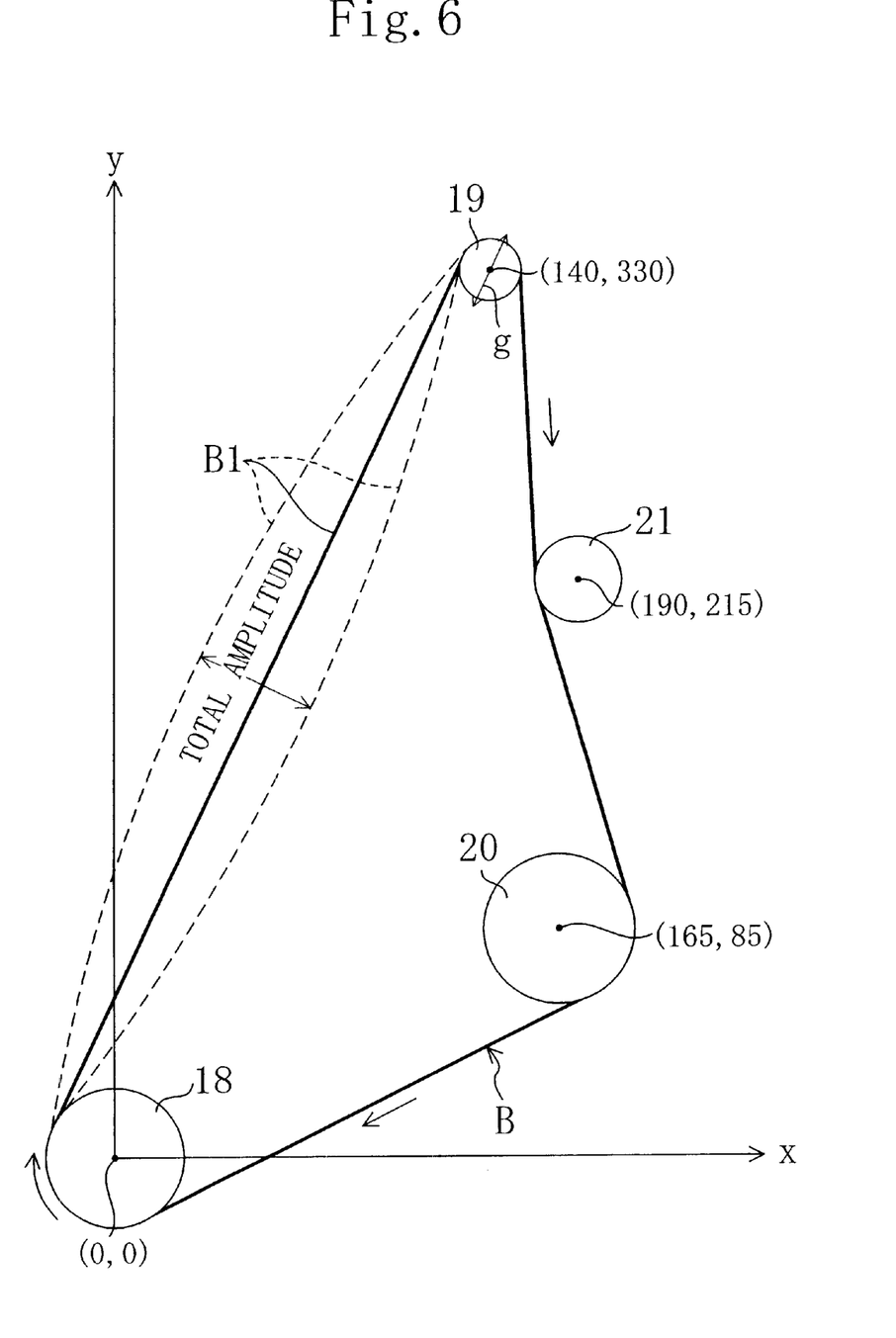
FIG. 6 is a diagram illustrating an engine auxiliary driving device for evaluating vibration and noise of the belt under a vibration and noise test.

Furthermore, a vibration and noise test was conducted on each of the above belts which was fitted to an actual engine auxiliary driving device. As shown in FIG. 6, the engine auxiliary driving device includes a crank pulley 18 of a 130 mm diameter V-ribbed pulley having its rotation center positioned at a point (0, 0) of rectangular x and y coordinates (unit: mm) and an alternator pulley 19 of a 57.5 mm diameter V-ribbed pulley having its rotation center positioned at a point (140, 330) of the x and y coordinates. The crank pulley 18 and the alternator pulley 19 are carried on unshown engine crank shaft and alternator input shaft for loading, respectively. Also, a first idler pulley 20 of a 140 mm diameter V-ribbed pulley and a second idler pulley of a 80 mm diameter flat pulley are disposed at points (165, 85) and (190, 215), respectively. In the test, each of the belts B (5PK1130) was entrained about the pulleys 18 through 21 such that its rib faces engaged the crank, alternator and first idler pulleys 18, 19 and 20 and its back face engaged the second idler pulley 21. In this condition, the crank pulley 18 was rotated, with a tension of 588.4 N placed on the belt B, at around 1500 rpm in a direction to put the belt into a tight side in its span between the idler pulleys 20 and 21, and a total amplitude of vibration (unit: mm) of the belt B in its slack-side span B1 between the crank and alternator pulleys 18, 19 was measured by an unshown sensor. Further, the alternator was fitted with an acceleration pickup (not shown) for sensing the acceleration of the alternator in a direction parallel with the belt slack-side span B1 between the crank and alternator pulleys 18, 19 (direction indicated by the arrow g in FIG. 6), and the magnitude of vibration (unit: acceleration G) of the alternator resulting from the amplitude of the belt B in its slack-side span B1 was measured by the pickup. Furthermore, a noise meter (not shown) was placed at a position 50 mm sidewardly apart from a belt portion in the slack-side span B1 located just before the entrance side of the alternator pulley 19, and the noise level was measured by the noise meter. In addition, evaluation was made about the audible nature (feeling of sound) of the noise (strike noise on the alternator pulley 19) and the loudness level. These test results are also shown in Table 2.

Flex Life Test for Belt

Figure 7:
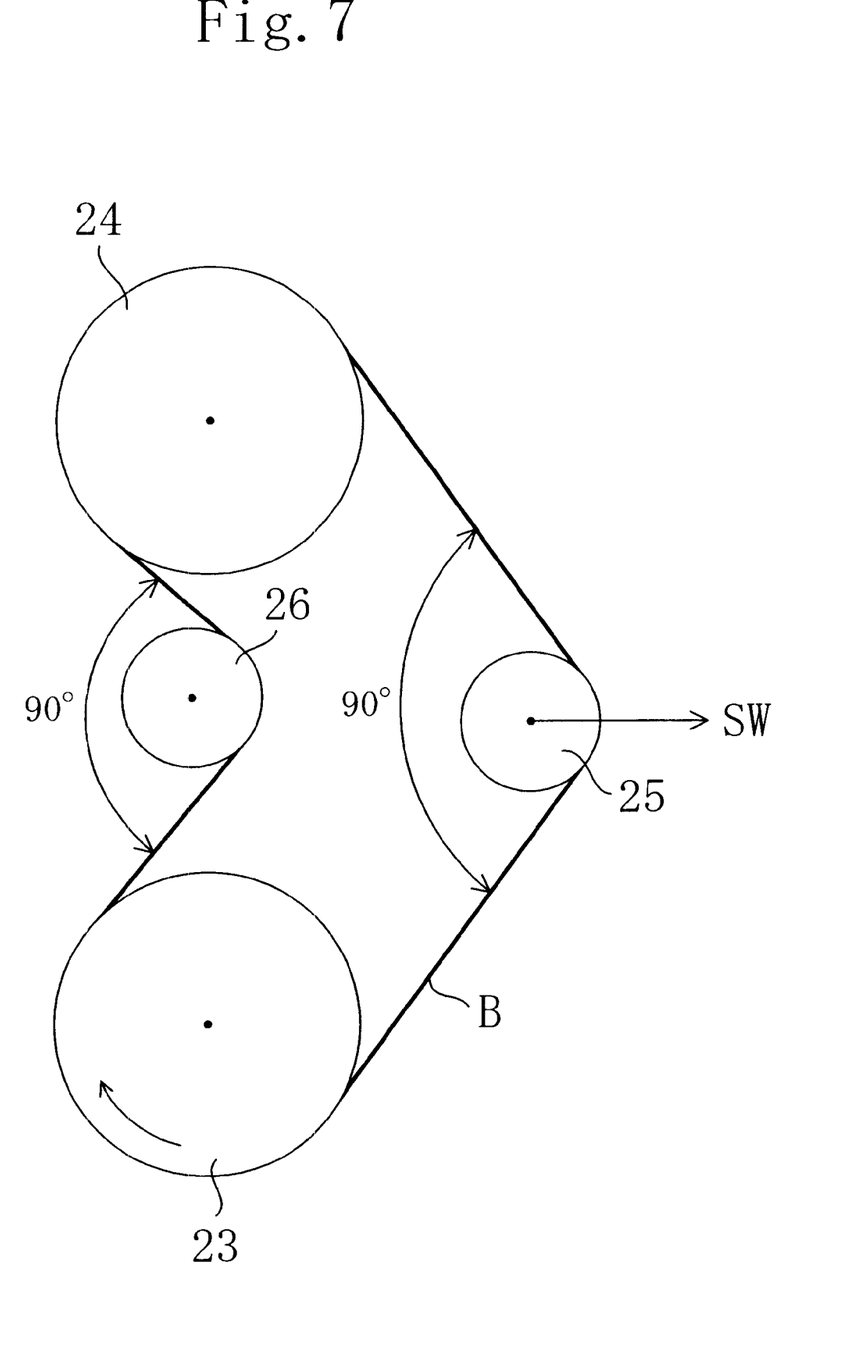
FIG. 7 is a diagram illustrating a testing device for evaluating a flex life of the belt.

Finally, each of the belts B was fitted to a flex life testing device and its flex life was measured. As shown in FIG. 7, the flex life testing device includes vertically arranged driving and driven pulleys 23 and 24 each formed of a 120 mm diameter V-ribbed pulley, a first idler pulley 25 of a 55 mm diameter V-ribbed pulley interposed between the driving and driven pulleys 23 and 24, and a second idler pulley 26 of a 85mm diameter flat pulley. In the test, each belt B was entrained about the pulleys 23 through 26 in such a manner that its rib faces engaged the driving, driven and first idler pulleys 23, 24 and 25, its back face engaged the second idler pulley 26 and the belt B was brought into contact at right angles with the respective idler pulleys 25 and 26. Next, the belt B was given a tension by placing a static load SW of 833.6 N on the first idler pulley 25, the driving pulley 23 was rotated at 4850 rpm with a load of 16 PS thrown on the driven pulley 24, and the life time (unit: hours (H)) of the belt B between the start of rotation and the occurrence of a crack therein was measured. During the test, the ambient temperature was 85±3 C°. The test result are shown in the following Table 2.

TABLE 2

| Belt characteristics | | Vibration and noise | Noise |
|---|---|---|---|
| Dynamic | Dynamic | Amp | level |

|  | elastic const. N/min | damping const. N·S/mm | Flexural rigidity N·cm² | of vib. mm | ALT acc. G | Audio feeling dB | Crack life H |
|---|---|---|---|---|---|---|---|
| INV. EXAMPLE | | | | | | | |
| 1 | 1258 | 0.209 | 36.608 | 10 | 0.09 | low "boon" 39 | 178 |
| 2 | 741 | 0.057 | 51.210 | 10 | 0.10 | middle "vaan" 40 | 144 |
| 3 | 1255 | 0.207 | 51.210 | 4 | 0.05 | null nothing 30 | 148 |
| COMP. EXAMPLE | | | | | | | |
| 1 | 740 | 0.060 | 36.020 | 15 | 0.18 | high "vaan" 47 | 173 |
| 2 | — | — | — | — | — | — | 70 |

The test results shown in the above Table 2 will be now considered. As can be understood from Table 2, when Inventive example 2 or 3 in which the dimension H1 from the rib-side end of the tension member 2 to the rib 3 bottom is more than 1.0 mm are compared with Inventive example 1 or Comparative example 1 in which the dimension H1 is below 1.0 mm, the former is relatively low in noise level. Further, Inventive example 2 or 3 in which the dimension H2 from the rib-side end of the tension member 2 to the rib 3 top is more than 3.0 mm is relatively small in its total amplitude of vibration and the acceleration of the alternator as compared with Inventive example 1 or Comparative example 1 in which the dimension H2 is below 3.0 mm. Furthermore, with reference to the flex life characteristic of the belt B, it will be noted that Inventive example 2, in which the dimension H1 from the rib-side end of the tension member 2 to the rib 3 bottom is below 2.0 mm and the dimension H2 from the rib-side end of the tension member 2 to the rib 3 top is below 4.0 mm, can elongate its life time as compared with Comparative example 2 in which the dimension H1 is over 2.0 mm and the dimension H2 is over 4.0 mm. Accordingly, it was proved that vibration and associated noise of the belt B can be reduced without decreasing the flex life thereof when the dimension H1 from the rib-side end of the tension member 2 to the rib 3 bottom is in the range of 1.0 to 2.0 mm or the dimension H2 from the rib-side end of the tension member 2 to the rib 3 top is in the range of 3.0 to 4.0 mm.

Next, by comparison of Inventive examples 1 and 3 each having a dynamic spring constant greater than 850 N/mm with Inventive example 2 and Comparative example 1 each having a dynamic spring constant smaller than 850 N/mm, it can be understood that the formers are relatively small in the total amplitude of vibration and the acceleration of the alternator and relatively low in noise level as compared with the latters. Accordingly, vibration of the belt B can be reduced by setting the dynamic spring constant of the belt B at 850 N/mm or more.

Further, also by comparison of Inventive examples 1 and 3 each having a dynamic damping constant greater than 0.065 N·S/mm with Inventive example 2 and Comparative example 1 each having a dynamic damping constant less than 0.065 N·S/mm, it can be understood that the formers are relatively small in the total amplitude of vibration and the acceleration of the alternator and relatively low in noise level as compared with the latters. Accordingly, vibration of the belt B can be also reduced by setting the dynamic damping constant of the belt B at 0.065 N·S/mm or more.

Furthermore, also by comparison of inventive examples 2 and 3 each having a flexural rigidity ei greater than 39.2 N·cm² with inventive example 1 and comparative example 1 each having a flexural rigidity EI less than 39.2 N·cm², it can be understood that the formers are relatively small in the total amplitude of vibration and the acceleration of the alternator and relatively low in noise level as compared with the latters. Accordingly, vibration of the belt B can be also reduced by setting the flexural rigidity thereof at 39.2 N·cm² or more.

What is claimed is:

1. A V-ribbed belt for driving engine accessories via pulleys by an engine, comprising:

a portion in which a tension member is embedded and
   a plurality of ribs formed in a bottom face of said portion to extend in parallel with one another along the length of the belt, wherein
   a dimension from a rib-side end of the tension member to a rib top is between about 150% to 200% of a dimension from said rib top to a rib bottom to reduce vibration of belt spans between pulleys.

2. The V-ribbed belt described in claim 1, wherein said dimension is between about 165% to 185% of a dimension from said rib top to said rib bottom.

* * * * *